United States Patent Office 3,843,566
Patented Oct. 22, 1974

3,843,566
MACRORETICULAR VINYL BENZYL
CHLORIDE POLYMERS
James H. Barrett, Cornwells Heights, Pa., assignor to
Rohm and Haas Company, Philadelphia, Pa.
No Drawing. Filed Apr. 16, 1973, Ser. No. 351,708
Int. Cl. C08d 19/00, 19/20
U.S. Cl. 260—2.1 E                 22 Claims

ABSTRACT OF THE DISCLOSURE

Insoluble macroreticular crosslinked polymers of vinyl benzyl chloride may be prepared by polymerizing vinyl benzyl chloride and a crosslinking monomer. The resulting polymers are further reacted to form ion exchange resins.

---

This invention concerns macroreticular copolymers of vinylbenzyl chloride and a crosslinker, such as divinylbenzene, which are useful as intermediates in the preparation of ion exchange resins such as anion exchange resins. The invention also concerns methods of preparing the polymers and the resins derived from such polymers.

Macroreticular polymers have been prepared in the prior art but by a process of first polymerizing or copolymerizing styrene and then chloromethylating the polymer. For further details of a typical prior art process, see U.K. 932,125 and U.S. 3,637,535. The chloromethylation process although widely used to provide polymers and ion exchange resins derived from such polymers possesses inherent disadvantages. For example, the chloromethyl ether used as chloromethylating agent to provide reactive chloro groups on the polymer is a substance of great toxicity. Consequently, expensive safety and protective equipment is required to safeguard operating personnel. Furthermore, the multi-stage nature of the prior art process makes it inherently more expensive than the one-step process utilized to manufacture the polymers of the present invention. Another disadvantage of the polymers of prior art process is their vulnerability to metal contamination which may occur due to the metal-containing catalysts frequently employed in the manufacturing process.

The polymers produced by such a prior art process are, after conversion, used to form ion exchange resins. Such known resins although satisfactory for many ion exchange utilizations have been criticized as being too fragile in certain fields of use. Areas of ion exchange resin use such as the removal of strong acids or weak acids from aqueous solution, as done in condensate polishing, nuclear loop water treatment or continuous ion exchange processes as practiced for example in sugar refineries, require resins which must possess long term resistance to degradation in functionality. Resistance to degradation during high temperature operating conditions is also important for good resin performance. Heretofore, a resin with a satisfactorily high column capacity was invariably too vulnerable physically for high stress operations such as the continuous ion exchange processes mentioned hereinbefore.

The life or durability of a resin is usually understood to be directly related to such characteristics as physical stability, thermal stability, organic fouling, oxidative stability and regeneration efficiency. A resin's physical stability is particularly important as a measure of its resistance to physical attrition since it is a direct reflection on the ability of the resin beads to withstand crumbling when subjected to heavy stresses. Physical stability may readily be calculated on the basis of results of the "Piston Pump Test," explained in more detail hereafter.

Another resin characteristic important in determining durability of a resin is its ability to withstand thermal degradation. This characteristic is normally termed thermal stability. Anion exchange resins in the hydroxide form are particularly susceptible to thermal degradation. Their short effective life in use areas such as boiler steam condensate purification, where the hydroxide form is required and high temperatures prevail, contributes substantially to the cost of their operation.

A third characteristic important in evaluating a resin is its regeneration efficiency which is normally determined by plotting the ratio of actual column capacity/theoretical column capacity (percent utilization) versus the ratio of equivalents of regenerant used/total equivalents available.

According to the invention there is provided a crosslinked macroreticular polymer of vinylbenzyl chloride and a process for preparing a macroreticular polymer containing reactive chlorine atoms and capable of being converted to an ion exchange resin which process comprises copolymerizing a vinyl benzyl chloride monomer with from .1 to 30% by weight of total polymer mixture of a crosslinking monomer. Preferred embodiments include a polymer comprising a crosslinked macroreticular copolymer of (1) at least 90 parts by weight of monomer containing vinylbenzyl chloride and (2) at most 10 parts by weight of polyvinylidene monomer containing a plurality of $CH_2=C<$ groups in non-conjugated relationship, said copolymer containing reactive methylene chloride groups as substituents on the aromatic nuclei and being substantially free of secondary crosslinks. According to the invention there is also provided an anion exchange resin comprising an aminated crosslinked macroreticular vinylbenzyl chloride polymer.

The invention provides a one-step polymerization process which avoids the toxicity problems of the prior art and provides polymers which are particularly suitable as intermediates to form ion exchange resins having not only improved physical stability, thermal stability, and regeneration efficiency but maintain these improved characteristics without loss of column capacity. It is this combination in one resin of high column capacity and high durability which causes the resin to be highly suitable for continuous exchange processes. Not only does the process of the invention eliminate the chloromethylation step but it produces in its preferred embodiment polymers which, when converted to ion exchange resins, have many of the following desirable ion exchange characteristics:

1. High column capacity
2. Excellent physical stability
3. Excellent thermal stability
4. Good regeneration efficiency
5. Good oxidative stability
6. Good resistance to organic fouling.

Furthermore, due to the simplified one-step process the polymers so produce are inherently more economical to produce. While the polymers of the invention are particularly suitable as intermediates in the preparation of ion exchange resins, due to the reactive nature of the polymer, they are also useful in the preparation of adsorbents, base substrates in the Merrifield synthesis, organic catalysts, chelating resin, plasticizer, modifiers and coating compositions. Many other uses in addition to those mentioned hereinbefore will be apparent to the skilled technician.

The advantages of the polymers of the invention are believed to be related to the substantial absence of secondary crosslinking. The chloromethylated polymers of the prior art usually possess a considerable degree of such secondary crosslinking. See Rieman et al., *Ion Exchange In Analytical Chemistry*, page 11 (1970) for further details of secondary crosslinking.

Often polymerization processes will utilize additives or modifiers which have specialized functions. These additives should of course be chosen such as to be mutually compatible. For example a preferred colloidal stabilizer for the process of the invention is gelatin. Gelatin has an isoelectric point at about pH 8. It should therefore be readily understood that when gelatin is the stabilizer the pH of the polymerization medium should not pass through this point to prevent possible serious impairment of the bead forming mechanism. Another stabilizer which may be useful in the process of the invention is magnesium silicate. Being an inorganic additive, the pH of a polymerization medium containing magnesium silicate instead of gelatin does not require such pH limitation.

Alkalinity of the polymerization medium may be maintained by one or more additions of a suitable base or the presence of a sufficient amount of buffering compounds. Other methods of maintaining an alkaline medium during polymerization will occur to those skilled in the art.

The polymerization of vinylbenzyl chloride and crosslinker is accelerated by a suitable catalyst.

Catalysts which provide free radicals which function as reaction initiators include benzoyl peroxide, tert-butyl hydroperoxide, cumene peroxide, tetralene peroxide, acetyl peroxide, caproyl peroxide, tert-butyl perbenzoate, tert-butyl diperphthalate, methyl ethyl ketone peroxide. Other suitable classes of free radical generating compounds include the azo catalysts.

Another method of effecting copolymerization is by subjecting the reaction mixture to ultra-violet light in the presence of suitable catalysts at ambient or slightly elevated temperatures. Such catalysts include benzoin and azobisiso butyronitrile.

The amount of catalyst required is roughly proportional to the concentration of the mixture of monomers. The usual range is from 0.01% to 3% by weight of catalysts, with reference to the total weight of the monomer mixture. The preferred range is from 0.5% to 1.5%. The optimum amount of catalyst is determined in large part by the nature of particular monomers selected, including the nature of the impurities which may accompany said monomers.

A preferred polymerization technique to practice the invention is suspension polymerization. The term "suspension polymerization" is a term well known to those skilled in the art and comprises suspending droplets of the monomer or monomer mixture in a medium in which the monomer or monomer mixture is substantially insoluble. This may be accomplished by adding the monomer or monomer mixture with any additives to the suspending medium which contains a dispersing or suspending agent such as, for instance, in the case of an aqueous suspending medium, the ammonium salt of a styrene maleic anhydride copolymer, carboxymethyl cellulose, bentonite, polyvinylimidazoline, or poly(diallyl-dimethylammonium chloride). The dispersant is preferably added in an amount of .001 to 5%, more preferably from 0.01 to 1%.

As is known in the art, macroreticular polymers are prepared by a process which involves the presence of a phase extender or precipitant. These precipitants vary widely in nature and are chosen to be particularly suitable with the monomer mixture used. For example, when employing monomers such as divinylbenzene as crosslinking monomers, alkanols with a carbon atom content of from 4–10 will suffice when used in amounts of from 30–50% of total polymer mixture used. Other suitable precipitants are aliphatic hydrocarbons containing at least 7 carbon atoms, such as heptane and isooctane. In general, the amounts of precipitant may vary from as little as 10% to as much as 80% of combined weight of monomer and precipitant.

A preferred precipitant is methyl isobutyl carbinol, preferably used in an amount of from 25–45% of total monomer mixture.

The polymerization process may be carried out at temperatures ranging from 60 to 100° C., although preferably the polymerization is performed between 70–90° C.

The vinylbenzyl chloride resins of the invention are hereinafter referred to as VBC resins. The prior art chloromethylated resins are referred to as CME resins.

The following table shows the effect of varying the amount of precipitant—methyl isobutyl carbinol (MIBC) on Anion Exchange Capacity (AEC), percent solids and copolymer porosity. The VBC resins of the table are typical strong base anion exchange resins of the type shown in Example I varying in amount of precipitant only and containing 6% divinylbenzene (DVB) as crosslinker:

TABLE I

| Resin number | Percent MIBC | AEC (meq./g.) | Solids (percent) | Copolymer porosity (vol., percent) |
|---|---|---|---|---|
| 1 | 28 | 4.31 | 41.4 | 3.5 |
| 2 | 30 | 4.36 | 38.6 | 20.2 |
| 3 | 35 | 4.38 | 33.6 | 29.8 |
| 4 | 40 | | | 46.2 |

While the use of a single precipitant facilitates recovery, purification and recycling of the precipitant, mixtures of precipitants can be used.

A preferred crosslinking monomer is divinyl benzene, but many alternative crosslinkers are suitable for use in the process of the invention. Suitable crosslinkers are divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, or glycerol, of pentaerythritol, of mono- or dithio- derivatives of glycols, and of resorcinol; divinylketone, allyl acrylate, diallyl fumarate, diallyl maleate, trimethylolpropane trimethacrylate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylene-diacrylamide, N,N'-methylene dimethacrylamide, N,N'-ethylenediacrylamide, 1,2-di-(α-methylmethylene sulfonamide) ethylene, trivinylbenzene, trivinylnaphthalene, and polyvinylanthracenes.

Other useful crosslinking monomers include the following: polyvinylaromatic hydrocarbons, such as trivinylbenzene, glycol dimethacrylates, such as ethylene glycol dimethacrylate, and polyvinyl ethers of polyhydric alcohols, such as divinoxyethane and trinoxypropane.

The ratio of vinylbenzyl chloride monomer to crosslinking monomer may vary depending on the use for which the copolymer is intended and upon the nature of crosslinker, although generally the crosslinker is present in an amount of 0.1 to 30%. Preefrably it is present in an amount of 1 to 10% and most preferably in an amount of 5 to 8%. It is also possible to utilize a mixed crosslinking system. The following Table II illustrates the effects of alternative crosslinking systems and amounts on AEC. The resins of Table II are typical strong base anion exchange resins varying only in crosslinker.

TABLE II

| Resin number | AEC (meq./g.) | DVB, percent [1] | TMPTMA [2] |
|---|---|---|---|
| 5 | 4.52 | 1.5 | 2 |
| 6 | 4.10 | 2 | 12 |
| 7 | 4.02 | 3 | 6 |

[1] Divinyl benzene activity 79.2%—remainder primarily ethylvinylbenzene.
[2] TMPTMA is trimethylolpropane trimethacrylate.

As mentioned hereinbefore various precipitants or phase extenders are suitable in the practice of the invention. Isooctane (IO) and 2-ethylhexanol (2-EH) were tested and the results are listed in the following Tables III and IV. Resins 12–15 were converted to weak base resins by aminolysis with dimethylamine, and are of the type shown in Example II. Resins 7–11 are strong base resins containing 6% DVB, of the type shown in Example I.

TABLE III

| Resin | Percent IO [1] | Porosity (vol., percent) | AEC (meg./q.) | Percent solids |
|---|---|---|---|---|
| 7 | 20 | | 4.43 | 43.0 |
| 8 | 25 | 32.6 | 4.34 | 35.5 |
| 9 | 30 | 46.4 | | |
| 10 | 50 | 65.0 | | |
| 11 | 55 | 69.0 | | |

[1] Footnote at end of table IV.

TABLE IV

| Resin | 2-EH, percent [1] | Porosity (vol., percent) | AEC (meg./q.) | Percent solids | Product porosity, (vol., percent) |
|---|---|---|---|---|---|
| 12 | 25 | 2.6 | 4.63 | 54.1 | |
| 13 | 30 | 2.5 | 5.09 | 53.5 | |
| 14 | 35 | 27.5 | 4.90 | 54.4 | 24.9 |
| 15 | 40 | 48.8 | 4.78 | 35.3 | 48.9 |

[1] The percentages of precipitants are based on total monomer mixture weight.

While the copolymers of the invention may be further reacted to find utility in a wide variation of fields, as mentioned hereinbefore the polymers are particularly suitable to be aminated to anion exchange resin.

A wide variety of amines can be employed in the amination reaction. Thus, primary, secondary, and tertiary alkylamines or arylamines can be employed. Polyalkylenepolyamines include ethylenediamine, diethylenetriamine, triethylenetetramine, tetraethylenepentamine, dimethylamine, trimethylamine, propylenediamine, and the like. Aminoalcohols such as dimethylaminoethanol can also be used successfully.

A preferred embodiment of the process of this invention employs a trialkylamine as the aminating agent, thus producing strong base, quaternary ammonium anion exchangers. The alkyl radical does not generally contain more than 4 carbon atoms, with trimethylamine being the preferred amine.

The following examples except one illustrate ways in which the principle of the invention has been applied but are not to be construed as limiting in scope. All percentages throughout the specification and claims are by weight unless otherwise indicated. Example III illustrates a known process of preparing a typical CME resin which corresponds in type to a resin prepared according to Example I.

EXAMPLE I

Preparation of a Macroreticular Type I Strong Base Resin 680 grams of water are placed in a flask. To the stirred aqueous phase, is added 4.4 g. of gelatin dissolved in 50 ml. of water, 6.4 g. poly(diallyldimethylammonium chloride) dispersant, 8.3 g. of boric acid, and 10.0 g. of 50% sodium hydroxide. The resulting solution is stirred for 30 minutes.

To the aqueous phase is added a solution of 475 g. of vinylbenzyl chloride, 39.0 g. of divinylbenzene (79.2% active), 276.7 g. of methyl isobutyl carbinol and 5.1 g. of benzoyl peroxide. The resulting mixture is heated with stirring to 80° C. and is held at that temperature for 10 hours. The inert solvent is removed by steam distillation and the resulting copolymeric beads are dried in a steam oven.

82.5 g. of beads and 400 g. of water are placed in a flask and stirred for 30 minutes. To the resulting slurry is added 34 grams of anhydrous trimethylamine and the mixture is stirred for 4 hours at 60° C. The temperature is increased slowly to 100° C. in order to remove the excess amine. The resulting mixture is cooled and the beads ar washed and bottled. The resulting strong base resin has an anion exchange capacity of 4.36 meq./g., a solids content of 34% and a porosity of 0.4 cc./cc.

EXAMPLE II

Preparation of a Macroreticular Weak Base Resin 680 grams of water are added to a flask. To the stirred aqueous phase is added 5.8 g. of poly(diallyldimethylammonium chloride), 4.0 g. of gelatin, 9.4 g. of boric acid, and 9.2 g. of 50% sodium hydroxide. The resulting solution is stirred and the monomer phase consisting of 410 g. of vinylbenzyl chloride, 40 g. of divinylbenzene (79.2% active), 264 g. of methylisobutyl carbinol, and 6.4 g. of benzoyl peroxide is added to the flask. The resulting mixture is heated to 80° C. for 10 hours and the inert solvent is removed by steam distillation. The resulting beads are washed with water and are dried in a steam oven overnight.

400 grams of the above copolymer are slurried in 390 ml. of water and 360 g. of 50% sodium hydroxide. To this mixture is added 610 ml. of 40% dimethylamine. The mixture is heated to 65° C. and is held at that temperature for 4 hours. At the end of that period the excess amine is removed by distillation and the product is washed to neutrality and bottled. The resulting weak base resin has a capacity of 5.28 meq./g. and a solids content of 42.8%.

The following additional step, if desired, is optional. To 136 g. of the above weak base resin in 195 g. of water is added 18.1 g. of 30% hydrogen peroxide to convert the resin to the amine oxide form to the extent of 19.7%. The mixture is stirred at 50° C. for 4 hours, the beads are washed with water and bottled.

The resulting weak base resin in the amine oxide form has a capacity of 5.11 meq./g. and a solids content of 38.5%. The porosity is 0.46 cc./cc. of beads.

EXAMPLE III

Preparation of Comparative Resin A

To 750 g. of water is added 4.4 g. of gelatin dissolved in 50 ml. of water, 6.4 g. of polyvinylimidazoline dispersant, 4.0 g. of boric acid, and 5.0 g. of 50% sodium hydroxide. The resulting aqueous phase is stirred for 30 minutes.

To the aqueous phase is added a solution consisting of 447 g. of styrene, 35 g. (55% active) of DVB, 318 g. of MIBC, and 4.8 g. of benzoyl peroxide. The resulting mixture is stirred rapidly at 80° for 10 hours and the inert solvent is removed by steam distillation. The resulting copolymeric beads are dried in a steam oven.

To 318 g. of the above copolymer is added 1260 g. of CME and 660 g. of ethylene dichloride. The resulting mixture is stirred at 35–40° C. for two hours. The mixture is cooled to 0–5° C. and 275 g. of aluminum chloride is added over a two hour period while maintaining the temperature below 25° C. The reaction mixture is then heated at 47–50° C. for a four hour period.

The resulting bead slurry is cooled to 0–5° C. and is quenched into 1500 ml. of cold water. The quenched mixture is drained and washed four times with 1500 ml. portions of water. The last wash is not removed and is adjusted with 20% solution of sodium carbonate to pH 8. The resulting product is drained and packed out.

To one third of the above chloromethylated intermediate slurry is added 290 g. of 25% aqueous trimethylamine (TMA) over a 1–1.5 hour period while maintaining the temperature at 10–15° C. After the amine addition is complete, the mixture is stirred for four hours at 10–15° C. The excess amine and solvent are removed by steam distillation and the beads are washed with water to give the final product.

Two application areas that have placed a premium on the physical stability of an ion exchange resin are steam-boiler condensate polishing and continuous ion exchange processes. Common to both of these application areas are the very high flow rates experienced by the resins in use. The piston pump test is an accelerated test developed to measure an ion exchange resin's resistance to attrition under these high flow rate conditions.

PISTON PUMP TEST

The test is performed on 200 ml. of resin in one inch diameter columns operating under constant pressure (40 lbs./p.s.i.). The resin is subjected to repeated cycles of treatment with 1.2 N-$H_2SO_4$ and 3.5 N-NaOH with water rinses between each solution. The acid and base solutions are passed upflow through the resin bed and the water rinses are passed downflow. Cycling is controlled automatically by a programmer, and the flow rates during exhaustion (acid) and regeneration (base) are measured every five cycles. The test is stopped after 50 cycles, since a good correlation has been developed between field performance and piston pump test performance at this level. The change in flow rate from the initial reading to that following 50 cycles is an excellent measure of the resin's physical stability. If breakdown occurs, smaller resin particles (fines) are being formed, and at constant pressure, a drop in flow rate would be observed. Conversely, if the resin exhibits no physical breakdown, the particle size remains essentially constant and hence the flow rate stays constant.

A second measure of resin stability in the piston pump test is the change in perfect bead count in the resin sample after 50 cycles. Representative resin samples taken before and after the test are examined microscopically for cracked beads. Obviously, the higher the perfect bead count after the test, the more stable the resin.

Macroreticular, strong base anion exchange resins prepared from vinyl benzyl chloride according to Example I exhibit excellent physical stability in the piston pump test compared to resins prepared from chloromethylated styrene according to comparative Example III. Typical results obtained for a CME resin and for a VBC resin are given below.

| Resin | AEC, meq./g. | Flow rate, liter/hr. | | Percent change flow | Percent perfect beads | |
|---|---|---|---|---|---|---|
| | | Initial | Final | | Before | After |
| VBC (Ex. I) | 4.36 | 100 | 100 | 0 | 99 | 99 |
| CME (comp. Ex. III) | 4.40 | 100 | 70 | 30 | 99 | 85 |

The test results were obtained on resin samples that were screened to the exact same particle size, therefore, the marked improvement in performance exhibited by the VBC resin can be directly attributed to its manner of preparation and not to variance in particle size distribution.

Quaternary ion exchange resins may be somewhat liable to decomposition particularly when in the hydroxide form. This instability is greatly enhanced by increased temperature. Two routes are followed by this decomposition reaction.

(1) Resin—$CH_2$—N—($-CH_3$)$_3$+$OH^-$→
　　　　　　　　Resin—$CH_2OH$+$N(CH_3)_3$
(2) Resin—$CH_2$—N—($-CH_3$)$_3$+$OH^-$→
　　　　　　　　Resin—$CH_2N$—($-CH_3$)$_2$+$CH_3OH$ In order to test the ion exchange resins of the invention for thermal stability, strong base anion exchange vinyl benzyl chloride resins of the type described in Example I and a corresponding chloromethylated resin as described in comparative Example III are subjected to the following test.

The resin as received is converted completely to the hydroxide form using approximately 1000 mls. of 1 N NaOH for 15 mls. of resin. The resin is rinsed with D.I. water and placed in an appropriate container containing excess D.I. water (at least a 20 to 1 water to resin ratio) and the container is placed in an oven of appropriate temperature. Periodically the sample is removed, completely converted to the HCl form and evaluated for solids content, and true strong base capacity. After this, the resin is reconverted to the hydroxide form using 1 N-HCl followed by 1 N-NaOH and replaced in the same temperature environment. Several spot checks are made at all temperatures to confirm that the resins are completely in the hydroxide form during the testing periods. The results indicate that the VBC resins have consistently greater thermal stability than the corresponding CME resins.

A further advantage that the strong base resins of the invention have over prior art CME resins is improved regeneration efficiency. The true regeneration efficiency of a strong base resin is determined by plotting the ratio-actual column capacity/theoretical column capacity (percent utilization), versus the ratio—equivalents of regenerant used/total equivalents available. A typical VBC resin when tested for regeneration efficiency as defined above and in accordance with known analytical procedures showed a significant improvement when compared to the regeneration efficiency of a typical and corresponding CME resin. The improved regeneration efficiency of VBC over the CME resins at normal use levels of regenerant is in the range of at least about 10% and may be as high as 30% for some embodiments under preferred conditions. The significance of this improved regeneration efficiency is that the end user can use less regenerant (caustic) to achieve a desired column capacity when using VBC resins than he can when using the CME resins, thereby, greatly reducing his overall regenerant costs.

We claim:

1. A crosslinked macroreticular polymer of vinylbenzyl chloride containing from 0.1 to 30% by weight of crosslinker.

2. A polymer as claimed in Claim 1 containing from 1 to 10% by weight of crosslinker.

3. A polymer as claimed in Claim 1 containing from 4 to 8% by weight of crosslinker.

4. A polymer as claimed in Claim 1 wherein the crosslinker comprises divinylbenzene.

5. A polymer as claimed in Claim 1 wherein the crosslinker comprises trimethylolpropane trimethacrylate.

6. A polymer as claimed in Claim 1 in bead form.

7. A polymer as claimed in Claim 1 being substantially free of secondary crosslinks.

8. A polymer as claimed in Claim 1 comprising a crosslinked macroreticular copolymer of (1) at least 90 parts by weight of monomer containing vinylbenzyl chloride and (2) at most 10 parts by weight of polyvinylidene monomer containing a plurality of $CH_2C<$ in non-conjugated relationship, said copolymer containing reactive methylene chloride groups as substituents on the aromatic nuclei and being substantially free of secondary crosslinks.

9. A process for preparing a macroreticular polymer containing reactive chlorine atoms and capable of being converted to an ion exchange resin which process comprises copolymerizing a vinylbenzyl chloride monomer with from .1 to 30% by weight of total polymer mixture of a crosslinking monomer in the presence of a phase extender or precipitant.

10. A process as claimed in Claim 9 wherein the monomers are copolymerized by a suspension polymerization reaction.

11. A process as claimed in Claim 9 wherein the crosslinking monomer comprises 4 to 8% by weight of total polymer mixture.

12. A process as claimed in Claim 9 wherein crosslinking monomer is trimethylolpropane trimethacrylate.

13. A process as claimed in Claim 9 wherein the crosslinking monomer is divinylbenzene.

14. A process as claimed in Claim 9 wherein the macroreticular polymer is aminated to form an anion exchange resin.

15. A polymer as claimed in Claim 14 wherein the macroreticular polymer is aminated to form a strong base anion exchange resin.

16. A process as claimed in Claim 14 wherein the macroreticular polymer is aminated to form a weak base anion exchange resin.

17. A process as claimed in Claim 15 wherein the macroreticular polymer is reacted with trimethylamine to form a strong base anion resin.

18. A process as claimed in Claim 16 wherein the macroreticular polymer is reacted with dimethylamine to form a weak base anion resin.

19. A process as claimed in claim 9 wherein the phase extender is methyl isobutyl carbinol.

20. An anion exchange resin comprising an aminated crosslinked macroreticular vinylbenzyl chloride polymer containing from 0.1 to 30% by weight of crosslinker.

21. A process of removing a component from a liquid which comprises treating the liquid with an ion exchange resin as claimed in Claim 20.

22. A process as claimed in Claim 21 wherein the ion exchange resin is a strong base anion exchange resin.

References Cited

UNITED STATES PATENTS

| | | | |
|---|---|---|---|
| 2,992,544 | 7/1961 | McMaster | 260—2.1 |
| 3,551,358 | 12/1970 | Grammont et al. | 260—2.2 |

FOREIGN PATENTS

| | | |
|---|---|---|
| 932,126 | 7/1963 | Great Britain. |

OTHER REFERENCES

Rohm and Haas, Brochure CM-32, June, 1969.

MELVIN GOLDSTEIN, Primary Examiner

U.S. Cl. X.R.

210—37; 260—2.5, 86.3, 87.5 R